(12) United States Patent
Cota-Robles et al.

(10) Patent No.: US 8,819,699 B2
(45) Date of Patent: Aug. 26, 2014

(54) CONTROLLING VIRTUAL MACHINES BASED ON PERFORMANCE COUNTERS

(75) Inventors: Erik C. Cota-Robles, Mountain View, CA (US); Steven M. Bennett, Hillsboro, OR (US); Andrew V. Anderson, Hillsboro, OR (US); Sebastian Schoenberg, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1352 days.

(21) Appl. No.: 11/618,446

(22) Filed: Dec. 29, 2006

(65) Prior Publication Data

US 2008/0163254 A1 Jul. 3, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ...................................................... 719/313

(58) Field of Classification Search
USPC ........................................................ 719/313
See application file for complete search history.

(56) References Cited

U.S. PATENT DOCUMENTS

| | | | |
|---|---|---|---|
| 2002/0161961 A1* | 10/2002 | Hardin et al. | 711/6 |
| 2003/0037089 A1* | 2/2003 | Cota-Robles et al. | 709/1 |
| 2005/0141554 A1* | 6/2005 | Hammarlund et al. | 370/468 |
| 2005/0240700 A1* | 10/2005 | Bennett et al. | 710/260 |

OTHER PUBLICATIONS

Barham et al., "Xen and the Art of Virtualization", 2003, pp. 1-14.*
Adams, Keith et al., "A Comparison of Software and Hardware Techniques for x86 Virtualization", Oct. 21-25, 2006, ACM, pp. 2-13.*

* cited by examiner

*Primary Examiner* — Andy Ho
*Assistant Examiner* — Timothy A Mudrick
(74) *Attorney, Agent, or Firm* — Trop, Pruner & Hu, P.C.

(57) ABSTRACT

Embodiments of apparatuses, methods, and systems for controlling virtual machines based on performance counters are disclosed. In one embodiment, an apparatus includes an event counter, a comparator, and virtualization control logic. The event counter is to keep an event count based on the number of occurrences of an event. The comparator is to determine whether the event count has reached a threshold value. The virtualization control logic is to transfer control of the apparatus from a guest to a host in response to the comparator determining that the event count has reached the threshold value.

17 Claims, 3 Drawing Sheets

METHOD 300

CONTROLLING VIRTUAL MACHINES BASED ON PERFORMANCE COUNTERS

BACKGROUND

1. Field

The present disclosure pertains to the field of information processing, and more particularly, to the field of using performance counters in a virtualization environment.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies. A physical processor may also support other instructions for maintaining a virtualization environment, and may include memory or register bits that indicate or control virtualization capabilities of the physical processor.

A physical processor supporting a virtualization environment may also include performance counters for logging performance monitoring information. Typically, these performance counters may be used to count occurrences of events related to the execution of software on the processor. For example, a performance counter may count the number of instructions executed or retired, or the occurrence of any condition resulting from the execution of software on the processor, such as a cache miss, a translation look-aside buffer miss, or a branch misprediction.

BRIEF DESCRIPTION OF THE FIGURES

The present invention is illustrated by way of example and not limitation in the accompanying figures.

DETAILED DESCRIPTION

The present invention may be embodied in an apparatus, a method, or a system for controlling virtual machines based on performance counters, as described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention provide for performance counters to be used to improve the performance of an information processing system supporting virtualization, by allowing host software to gain control from guest software based on performance measurements taken during the execution of the guest software. The host software may then have the ability and the information useful to make scheduling and other decisions to optimize absolute or relative performance, or otherwise monitor guest performance.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

Figure 1:
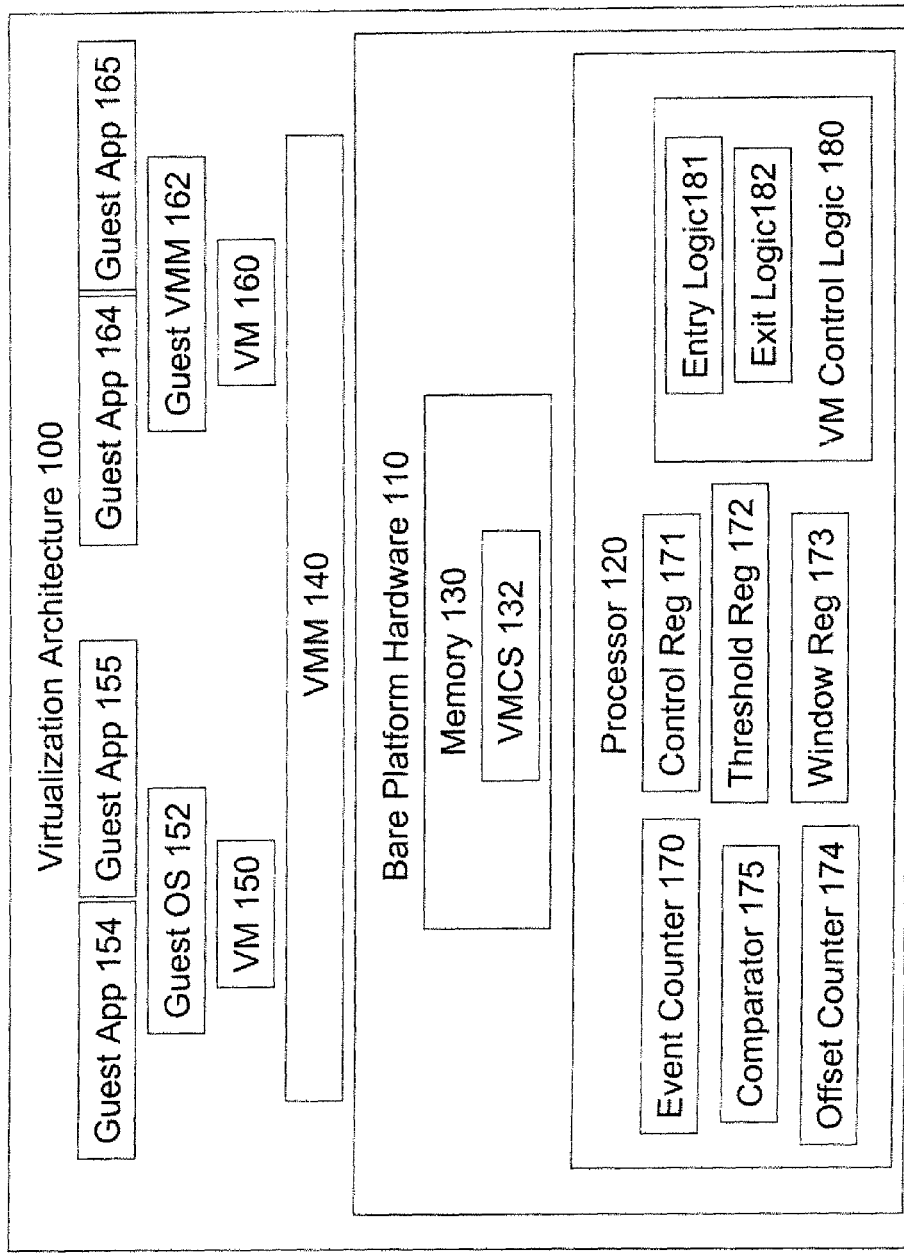
FIG. 1 illustrates an embodiment of the present invention in an information processing system.

FIG. 1 illustrates an embodiment of the present invention in information processing system 100. In FIG. 1, bare platform hardware 110 may be any data processing apparatus capable of executing any OS, VMM, or other such software. For example, bare platform hardware may be that of a personal computer, mainframe computer, portable computer, handheld device, set-top box, server, or any other computing system. Bare platform hardware 110 includes processor 120 and memory 130.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare platform hardware 110 may include any number of processors, including any number of multicore processors, each with any number of execution cores, and any number of multithreaded processors, each with any number of threads.

Memory 130 may be static or dynamic random access memory, semiconductor-based read-only or flash memory, magnetic or optical disk memory, any other type of medium readable by processor 120, or any combination of such mediums. Processor 120 and memory 130 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150 and 160, guest operating systems 152 and 162, and guest applications 154, 155, 164, and 165.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed on VM 150 and guest OS 162 and guest applications 164 and 165 installed on VM 160. Although FIG. 1 shows only two VMs and two applications per VM, any number of VMs may be created, and any number of applications may run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "virtualization events" herein. Some of these virtualization events are referred to as "privileged events" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of processor 120. When a privileged event occurs or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, and any other such information. Processor 120 reads information from VMCS 132 to determine the execution environment of a VM and constrain its behavior. In this embodiment, VMCS 132 is stored in memory 130. In some embodiments, multiple VMCSs are used to support multiple VMs. Although FIG. 1 shows VMCS 132 stored in memory 130, storing a VMCS in a memory may not be required by the present invention.

Processor 120 also includes event counter 170, which may be any structure to perform a counting function, such as a hardware register configured to increment (or decrement) its contents upon the occurrence of any specified event. In this embodiment, event counter 170 is a performance counter that may be programmed by software running on processor 120 to log performance monitoring information. Other embodiments may include any number of counters and/or any type or size of counter. Event counter 170 may be programmed to increment (or decrement) for each occurrence of a selected event, or to increment (or decrement) for each clock cycle during a selected event. The event may be any of a variety of events related to the execution of software on processor 120, or conditions resulting from the execution of software on processor 120, such as retirement of instructions, branch mispredictions, cache hits, cache misses, translation lookaside buffer hits, translation lookaside buffer misses, wait cycles, memory-bus activities, etc. Therefore, event counter 170 may be used for tuning or profiling program code to yield the best possible performance on processor 120.

Processor 120 also includes event counter control register 171, threshold register 172, and window size register 173. Each of event counter control register 171, threshold register 172, and window size register 173 may be any register, storage location, or any other structure of any size, or portion of one or more registers, storage locations, or other structures, for storing information.

Event counter control register 171 is to store information to control or configure event counter 170. Event counter control register 171 may be programmed with information to control or configure event counter 170, such as information to enable event counter 170, to select the event to be counted, to select the method of counting (e.g., number of occurrences or duration of event), to select conditions for counting (e.g., based on privilege level of software executing when event is detected) and to set any other control, configuration, or other variables.

Threshold register 172 may be programmed with a threshold value to be compared to the contents of event counter 170, as described below. The threshold value may be represented in any form, such as a whole number that is to be directly compared to the contents of event counter 170, any number that may be logically or arithmetically transformed to be compared to the contents of event counter 170, or any number that may be compared to the logically or arithmetically transformed contents of event counter 170.

Window size register 173 may be programmed with a window size, where the window size may be any quantity of any system parameter that may be measured. In this embodiment, the window is a period of time, and the window size may be any number of cycles of the clock used to synchronize instruction execution by processor 120. Therefore, using the window size as further described below, the number of occurrences of the event being counted by event counter 170 may be considered on a relative rather than an absolute basis, i.e., the number may be considered relative to the passage by time. In other embodiments where the window is also a period of time, any other clock accessible to processor 120 or system 100 may be used. In other embodiments, the window may correspond to a different system parameter, such as anything that could be counted by an event counter similar to event counter 170. For example, event counter 170 may be programmed to count cache misses, and the window size may be measured in the number of instructions retired, so that cache misses may be considered relative to the number of instructions retired.

Processor 120 also includes offset counter 174 to count the window parameter. In this embodiment offset counter 174 counts clock cycles. In other embodiments, offset counter 174 may be any other type of counter, including a performance counter identical or similar to event counter 170.

The operation of embodiments of the present invention, where offset counter 174 is not present, used, or enabled, may be referred to as absolute mode operation. In embodiments using absolute mode operation, event counter 170 may increment for each occurrence of the event that it has been configured to count. Event counter 170 may be reset by software to begin counting from a known value, such as zero, at any desired time. Therefore, embodiments using absolute mode operation could alternatively use a decrementing counter rather than an incrementing counter, and could increment or decrement the counter by any quantity per event.

The operation of embodiments of the present invention, where offset counter 174 is used in addition to event counter 170, may be referred to as relative mode operation. In embodiments using relative mode operation, the count of offset counter 174 may be used to directly or indirectly offset the count of event counter 170. In one embodiment, where event counter 170 increments (or decrements) for each occurrence of a specified event, offset counter 174 may be used to count clock cycles, and each time the number of clock cycles reaches (i.e., matches or exceeds) the window size, event counter 170 is decremented (or incremented, as appropriate), and offset counter 174 is reset. Therefore, the number of occurrences of events reflected by the contents of event counter 170 is not absolute; instead, it may be considered relative to the passage of time. In some embodiments, event counter 170 may not be decremented beyond a floor value, such as zero (or incremented beyond a ceiling value).

In other embodiments using relative mode operation, many other permutations or the use of event counter 170 and offset counter 174 are possible. For example, event counter 170 may be directly adjusted based on the contents of offset counter 174. Or, the contents of offset counter 174 may be indirectly adjusted by offsetting (e.g., subtracting) the contents of offset counter 174 from the contents of event counter 170 (with or without scaling or otherwise manipulating the inputs or output of the offsetting operation) before being used as described below. In some embodiments, the window parameter may be chosen such that any combination of incrementing or decrementing by a fixed amount, incrementing or decrementing by a variable amount, loading, or clearing event counter 170 and/or offset counter 174 may be used. In some embodiments, there may be more than one event counter, more than one offset counter, more than one threshold register, and/or more than one window size register, in any number of dedicated or shared arrangements, such that any desired relationship among the counters and registers is possible. For example, one window size register and one corresponding offset counter may be used in connection with two or more threshold registers and two or more corresponding event counters.

In embodiments using absolute mode operation, event counter 170 may be a performance counter provided and used for well-known purposes, which may also be used according to embodiments of the present invention. In embodiments using relative mode operation, event counter 170 may be a substantial duplicate of a performance counter provided and used for well-known purposes, with changes being made to the substantial duplicate according to embodiments of the invention (e.g., decrementing based on offset counter 174) so that the original may continue to serve its well-known purpose.

In embodiments using absolute mode operation, event counter 170 may be a performance counter provided and used for well-known purposes, which may also be used according to embodiments of the present invention. In embodiments using relative mode operation, event counter 170 may be a substantial duplicate of a performance counter provided and used for well-known purposes, with changes being made to the substantial duplicate according to embodiments of the invention (e.g., decrementing based on offset counter) so that the original may continue to serve its well-known purpose.

Processor 120 also includes comparator 175, which may be any structure to perform a comparison function. In this embodiment, comparator 175 compares the contents of event counter 170 to the contents of threshold register 172. In other embodiments, the contents of event counter 170 and/or the contents of threshold register 172 may be manipulated, for example by subtracting an offset count from the event count as described above, before the comparison is made.

The comparison results in a determination as to whether the event count has reached (i.e., matched or exceeded) the threshold value. The result of the determination may be communicated to virtualization control hardware 180, described below, as an internal signal within processor 120, or according to any other approach.

Processor 120 includes virtualization control hardware 180 to support the creation and management of virtual machines. Virtualization control hardware 180 may be microcode, programmable logic, hard-coded logic, or any other form of control hardware within processor 120.

Virtualization control hardware 180 may cause processor 120 to execute portions of method embodiments of the present invention, such as the method embodiments described below with reference to FIGS. 2 and 3, for example, by causing processor 120 to include the execution of one or more virtualization micro-operations in its response to virtualization instructions or other instructions from a host or guest.

Virtualization control hardware 180 includes VM entry logic 181 to transfer control of processor 120 from a host to a guest (i.e., a VM entry) and VM exit logic 182 to transfer control of processor 120 from a guest to a host (i.e., a VM exit). In some embodiments, control may also be transferred from a guest to a guest or from a host to a host. For example, in an embodiment supporting layered virtualization, software running on a VM on processor 120 may be both a guest and a host (e.g., a VMM running on a VM is a guest to the VMM that controls that VM and a host to a guest running on a VM that it controls).

According to embodiments of the present invention, virtualization control hardware receives the result of the determination by comparator 175. If the determination is that the threshold value has been reached while guest software, OS 152, is executing on a processor 120, virtualization control hardware 180 causes a VM exit to occur. The VM exit may include saving guest state, including the event count of event counter 170, according to any known approach, such as to a designated storage location in VMCS 132, so that the host, e.g., VMM 150, may have information useful for managing the virtualization environment.

Figure 2:
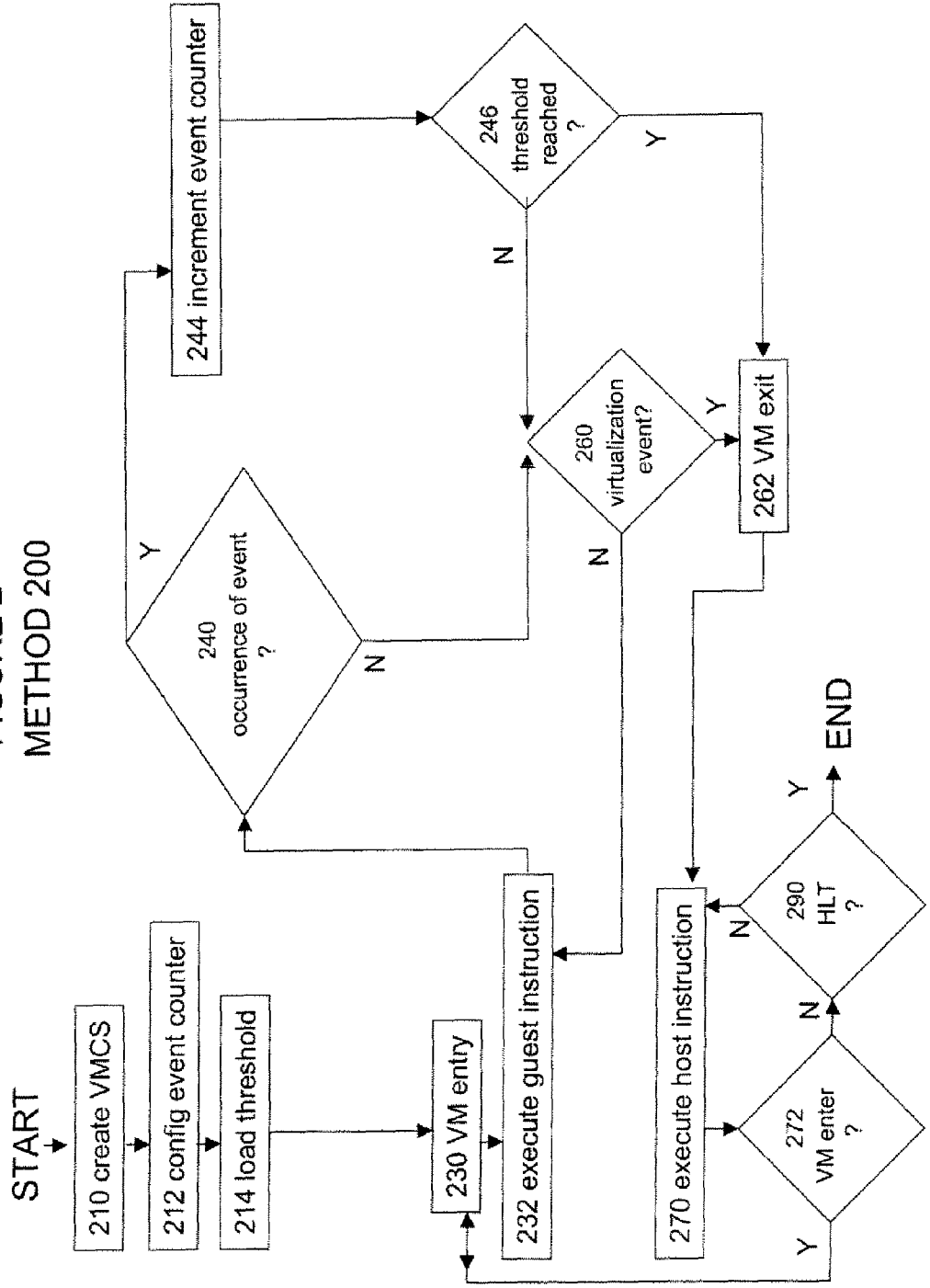
FIG. 2 illustrates an embodiment of the present invention in a method for controlling a virtual machine based on a performance counter according to an absolute mode of operation.

FIG. 2 illustrates an embodiment of the present invention in method 200, a method for controlling a virtual machine based on a performance counter according to an absolute mode of operation. Although method embodiments are not limited in this respect, reference is made to information processing system 100 of FIG. 1 to describe the method embodiment of FIG. 2.

In box 210 of FIG. 2, a VMM (e.g., VMM 140) creates a VMCS (e.g., VMCS 132) for a VM (e.g., VM 150). In box 212, a first performance counter is configured to count occurrences of an event. For example, event counter 170 may be configured, by programming event counter control register 171, to count instructions retired. In box 214, a threshold value is loaded into a threshold register. In one embodiment, the performance counters, event counter, event counter control register, and threshold register may be configured by the VMM by writing values into the VMCS, processor registers, or any other storage location or locations. The processor may load or otherwise enable the desired configuration as part of the VM entry.

In box 260, it is determined whether a virtualization event has occurred. If not, method 200 continues at box 232. If so, then, in box 262, control of processor 120 is transferred from the guest to the host. The transfer of control, or VM exit, may include VM exit logic 182 causing processor 120 to execute operations or micro-operations to save the guest state (including performance counter values, etc.) and load the host state. Box 262 may also include resetting the event counter, either as part of the VM exit or otherwise. As part of the VM exit, the event counter may be reset automatically or only when indicated by a VM exit reason. In another embodiment, the event counter may be reset upon a VM entry instead of a VM exit. Processor 120 may or may not continue to count events while executing the VMM.

In box 270, the host begins or continues to execute instructions. In box 272, it is determined whether a VM entry is to occur. If so, method 200 continues at box 230. If not, method 200 continues at box 290. In box 290, it is determined whether a halt or other such instruction is to be executed. If not, method 200 continues at box 270. If so, method 200 ends.

Figure 3:
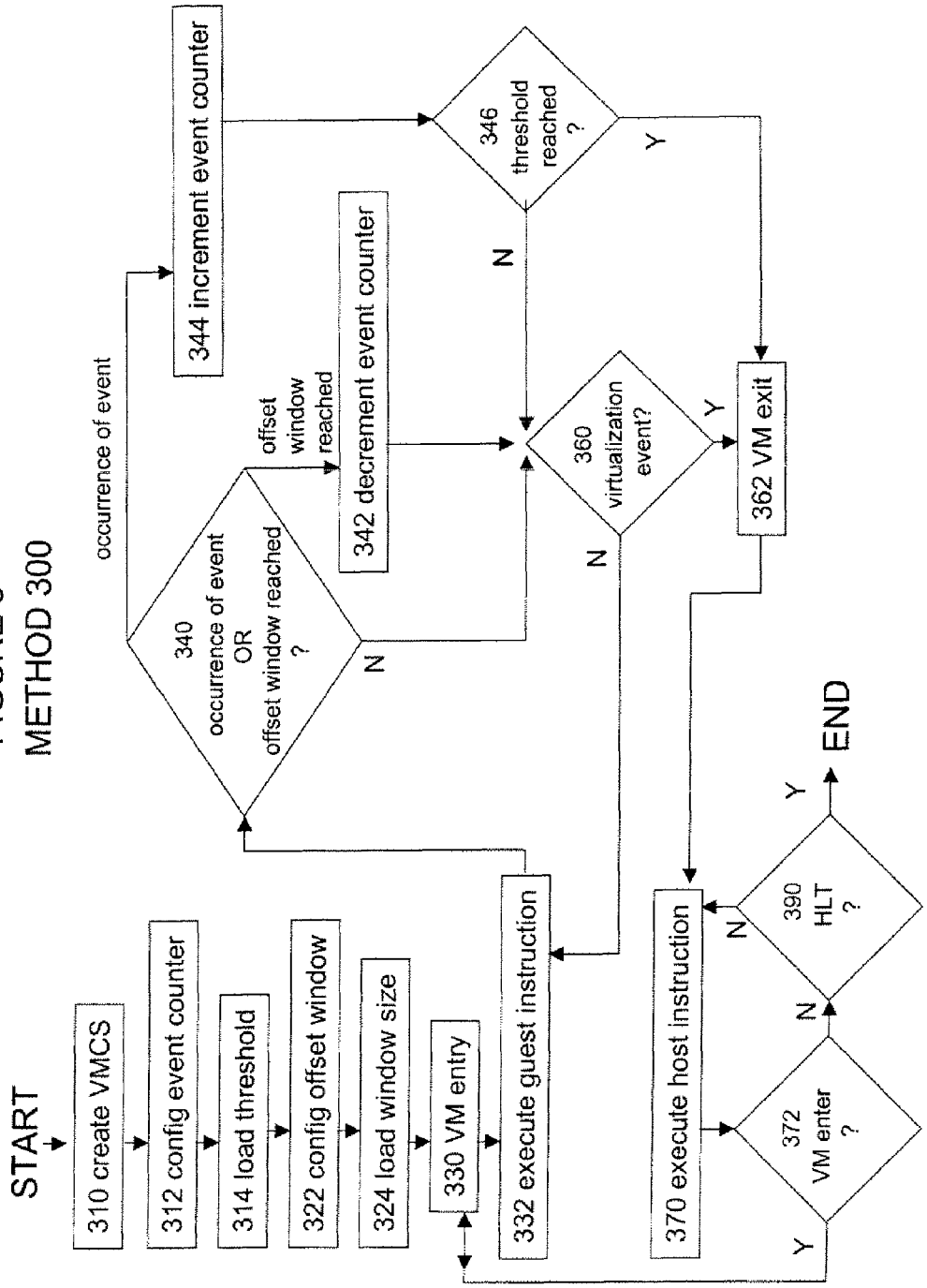
FIG. 3 illustrates an embodiment of the present invention in a method for controlling a virtual machine based on a performance counter according to a relative mode of operation.

FIG. 3 illustrates an another embodiment of the present invention in method 300, a method for controlling a virtual machine based on a performance counter according to a relative mode of operation. Although method embodiments are not limited in this respect, reference is made to information processing system 100 of FIG. 1 to describe the method embodiment of FIG. 3.

In box 310 of FIG. 3, a VMM (e.g., VMM 140) creates a VMCS (e.g., VMCS 132) for a VM (e.g., VM 150). In box 312, a first performance counter is configured to count occurrences of an event. For example, event counter 170 may be configured, by programming event counter control register 171, to count instructions retired. In box 314, a threshold value is loaded into a threshold register.

In box 320, an offset register is configured to count clock cycles. In box 322, the number of clock cycles desired to be used as a window size is loaded into a window size register. In one embodiment, the performance counters, event counter, event counter control register, threshold register, offset register, and window size register may be configured by the VMM by writing values into the VMCS, processor registers, or any other storage location or locations. The processor may load or otherwise enable the desired configuration as part of the VM entry.

In box 330, control of processor 120 is transferred from the host (i.e., VMM 140) to a guest (e.g., OS 152). The transfer of control, or VM entry, may include VM entry logic 181 causing processor 120 to execute operations or micro-operations to save the host state and load the guest state. In box 332, the guest begins or continues to execute instructions.

In box 340, it is determined whether the event has occurred or the offset count has reached the window size. If neither, method 300 continues at box 360. If the offset count has reached the window size, then, in box 342, the event counter decrements, and method 330 continues to box 360. In an embodiment, the even counter cannot be decremented below a floor value, e.g., zero. If the event has occurred, then, in box 344, the event counter increments. In box 346, the event count is compared to the threshold value. If the event count has not reached the threshold value, then method 300 continues at box 360. If so, method 300 continues at box 362.

In box 360, it is determined whether a virtualization event has occurred. If not, method 300 continues at box 332. If so, then, in box 362, control of processor 120 is transferred from the guest to the host. The transfer of control, or VM exit, may include VM exit logic 182 causing processor 120 to execute operations or micro-operations to save the guest state (including performance counter values, etc.) and load the host state. Box 362 may also include resetting the event counter, wither as part of the VM exit or otherwise. As part of the VM exit, the event counter may be reset automatically or only when indicated by a VM exit reason. In another embodiment, the event counter may be reset upon a VM entry instead of a VM exit. Processor 120 may or may not continue to count events while executing the VMM.

In box 370, the host begins or continues to execute instructions. In box 372, it is determined whether a VM entry is to occur. If so, method 300 continues at box 330. If not, method 300 continues at box 390. In box 390, it is determined whether a halt or other such instruction is to be executed. If not, method 300 continues at box 370. If so, method 300 ends.

Within the scope of the present invention, the methods illustrated in FIGS. 2 and 3 may be performed in a different order, with illustrated boxes omitted, with additional boxes added, or with a combination of reordered, omitted, or additional boxes. For example, in box 340 of FIG. 3, an event may occur at the same time the offset count reaches the window size. In this case, embodiments of the invention may be implemented to give priority to one or the other situation and the boxes of method 300 may be rearranged accordingly or executed in series. Furthermore, although methods 200 and 300 have been illustrated as part of virtualization system, aspects of these and other described embodiments of the present invention (such as relative-mode operation) may be applicable in non-virtualized systems as well.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for controlling virtual machines with performance counters have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure.

For example, embodiments of the present invention may include configuration logic to provide for enabling and disabling the operation of the embodiment, either in whole or in part, such as to select between absolute mode operation and relative mode operation. Embodiments may provide for automatically reloading threshold values or resetting event or offset counters as part of a VM entry or exit, either based on the setting of a control bit or otherwise. Embodiments may provide for suppressing, rather than causing, VM exits based on performance counters. For example, embodiments of the present invention may be used in connection with real-time control of devices from a VM, to prevent a guest from being interrupted (e.g., by a VM exit) during critical operations, or in connection with direct delivery of interrupts to a guest, to prevent a guest from being interrupted by a hardware interrupt that it does not own. Embodiments may provide for logging the determinations of the comparator, as described above, in a storage location accessible to a VMM, such as system memory or processor registers, rather than using it to cause VM exits, in connection with the automatic reloading described above, or otherwise.

In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    a first event counter to keep a first event count based on the number of occurrences of a first event;
    a second event counter to keep a second event count based on the number of occurrences of a second event, wherein the first event counter is to decrement the first event count when the second event count reaches a window value;
    a comparator to determine whether the first event count has reached a threshold value; and
    virtualization control logic to transfer control of the apparatus between a guest and a host in response to the comparator determining that the first event count has reached the threshold value, and to store the first event count to a virtual machine control structure stored in a memory prior to the transfer of control of the apparatus between the guest and the host, the virtual machine control structure to contain a state of the guest, a state of the host, and control information.

2. The apparatus of claim 1, wherein the first event is instruction retirement.

3. The apparatus of claim 1, further comprising a programmable event selection storage location to select a condition resulting from the execution of software as the first event.

4. The apparatus of claim 1, further comprising a programmable threshold storage location to store the threshold value.

5. The apparatus of claim 1, wherein the first event counter is to increment the first event count for each occurrence of the first event.

6. The apparatus of claim 5, wherein the first event counter is to decrement the first event count for each elapse of a period of time corresponding to the window value.

7. The apparatus of claim 6, further comprising a programmable window size storage location to store a window size corresponding to the window value to define the period of time.

8. The apparatus of claim 6, wherein the second event counter is to keep a clock count, where the clock count is to be used to determine whether a number of clock cycles corresponding to the period of time have elapsed.

9. A method comprising:
    configuring a first event counter in a processor to keep a first event count based on occurrences of a first event;
    configuring a second event counter in the processor to keep a second event count based on occurrences of a second event;
    incrementing the first event counter for each occurrence of the first event;
    decrementing the first event counter for each elapse of a period of time, based on the second event count;
    determining whether the first event count has reached a threshold value;
    transferring control of the processor between a guest and a host in response to determining that the first event count has reached the threshold value; and
    storing the first event count to a virtual machine control structure stored in a memory.

10. The method of claim 9, wherein the first event is instruction retirement.

11. The method of claim 9, wherein configuring the first event counter includes selecting a condition resulting from the execution of software as the first event.

12. The method of claim 9, further comprising storing the threshold value in a threshold storage location accessible to the processor.

13. The method of claim 9, further comprising defining the period of time by storing a window size in a window size storage location accessible to the processor.

14. The method of claim 9, further comprising counting clock cycles to determine whether a number of clock cycles corresponding to the period of time have elapsed.

15. The method of claim 9, further comprising transferring control of the processor from the host to the guest after configuring the first event counter and the second event counter and before comparing the first event count to the threshold value.

16. A system comprising:
    a processor including:
        a first event counter to keep a first event count based on the number of occurrences of a first event,
        a second event counter to keep a second event count based on the number of occurrences of a second event, wherein the first event counter is to decrement the first event count when the second event count reaches a window value,
        a comparator to determine whether the first event count has reached a threshold value, and
        virtualization control hardware to transfer control of the processor between a guest running on a virtual machine and a host running outside the virtual machine, in response to the comparator determining that the first event count has reached the threshold value, and to store the first event count to a data structure; and
    a memory to store the data structure to control the virtual machine.

17. The system of claim 16, wherein the memory is dynamic random access memory, and the data structure comprises a virtual machine control structure.

\* \* \* \* \*